United States Patent [19]

Knepper et al.

[11] 4,335,565
[45] Jun. 22, 1982

[54] LATCH MECHANISM FOR COMBINE HAVING ELECTRONIC AND MECHANICAL STONE DETECTORS

[75] Inventors: Larimer J. Knepper; John J. Komancheck, both of New Holland, Pa.

[73] Assignee: Sperry Corporation, New Holland, Pa.

[21] Appl. No.: 246,986

[22] Filed: Mar. 24, 1981

[51] Int. Cl.³ .............................................. A01F 12/10
[52] U.S. Cl. .................................. 56/10.2; 130/27 JT
[58] Field of Search ........................ 56/10.2, DIG. 15; 130/27 JT, 27 R; 209/82

[56] References Cited

U.S. PATENT DOCUMENTS 3,971,390  7/1976  McDuffie et al. ....................... 56/10.2
4,146,038  3/1979  DeBusscher et al. ........... 130/27 JT Primary Examiner—Jay N. Eskovitz
Attorney, Agent, or Firm—Larry W. Miller; Frank A. Seemar

[57] ABSTRACT

A latch mechanism for the trap door of a combine stone detector is disclosed wherein the latch mechanism is operable to release the trap door for ejection of a stone or other non-crop foreign matter from the feed path of the crop being harvested when the foreign matter is detected either electronically or mechanically. A release mechanism is provided to unlatch the trap door when a pinch roller forces foreign matter downwardly against the trap door. A trip mechanism is operatively connected with the release mechanism to unlatch the trap door when a signal is received from the electronic detection mechanism.

17 Claims, 12 Drawing Figures

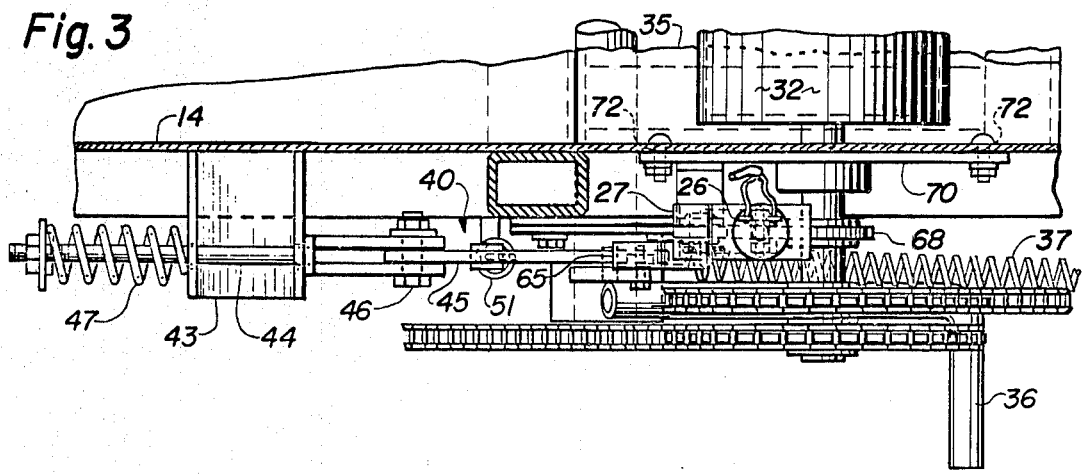
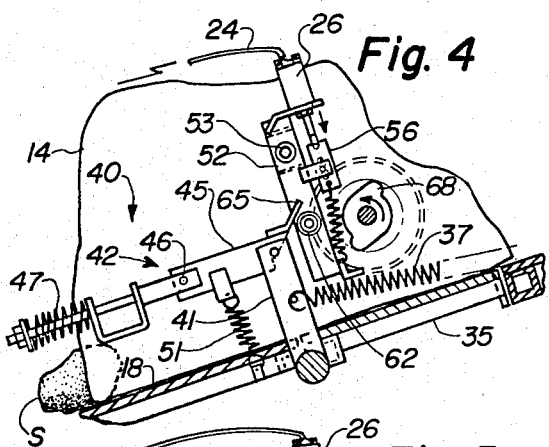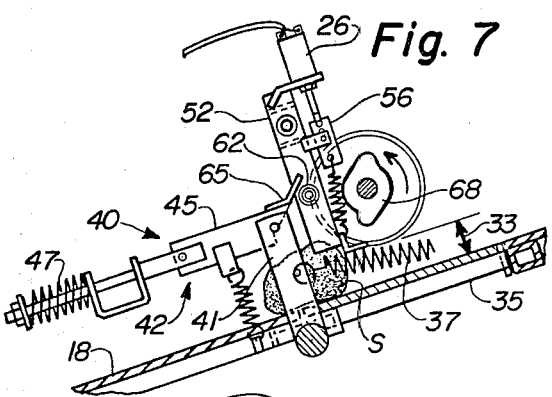
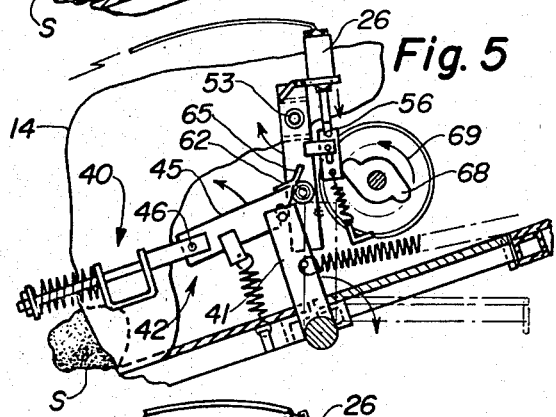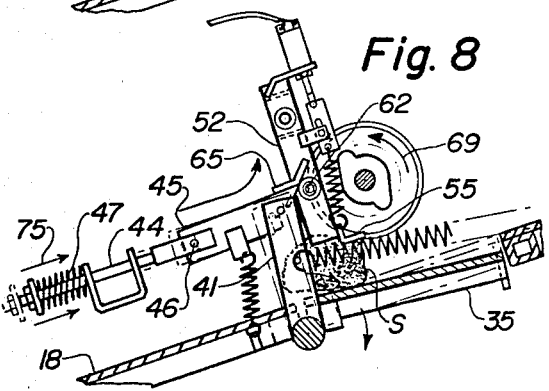
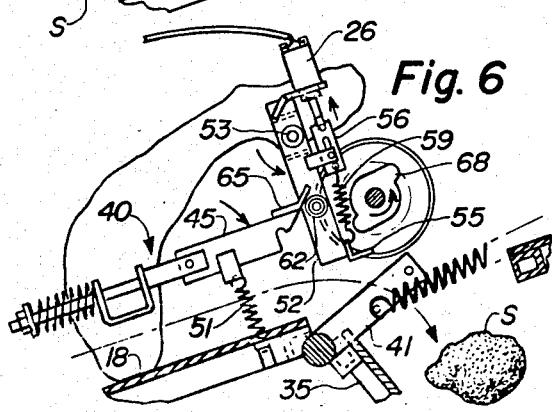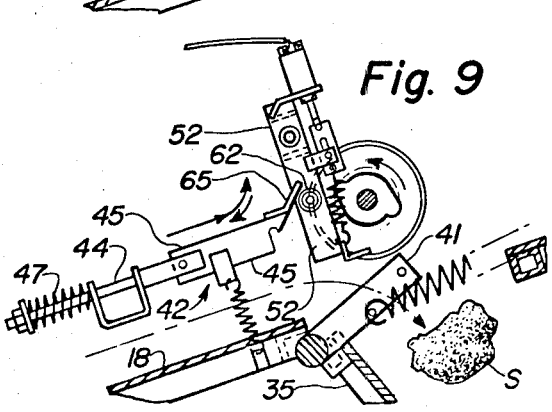

LATCH MECHANISM FOR COMBINE HAVING ELECTRONIC AND MECHANICAL STONE DETECTORS

BACKGROUND OF THE INVENTION

The present invention relates generally to the detection and ejection of foreign matter from crop harvesting machines and, more particularly, to a latch mechanism which can be actuated by either electronic or mechanical foreign matter detection devices to release a trap door for ejection of the foreign matter from the flow of crop being harvested.

Generally, crop harvesting machines, commonly referred to as combines, include a crop harvesting header mounted at the forward end thereof to initiate the crop harvesting process. Normally, the harvested crop is consolidated within the header and fed to a centrally located conveying mechanism within a feeder housing. From the feeder housing the harvested crop is fed to the combine base unit for further harvesting treatment.

It has been found desirable to eliminate non-crop foreign matter from the flow of harvested crop before it reaches the base unit for further harvesting treatment. Foreign matter includes stones, wood and other debris and such can be harmful to the harvesting equipment normally housed within the base unit. Combines utilizing the rotary harvesting principal are particularly susceptible to damage from such non-crop foreign matter.

Accordingly, non-crop foreign matter detection devices, commonly referred to as stone traps, have been developed. One such mechanical detection device utilizes a pinch roller mounted above the flow of crop material through the feeder housing a predetermined distance above a trap door. Non-compressible matter, such as stones, entering the crop flow between the pinch roller and the trap door and having a height greater than the distance between the roller and trap door, is forced downwardly against the trap door to force the trap door open and eject the foreign matter. Electronic detection devices have also been developed for sensing the presence of such matter and emitting a signal receivable by an ejection mechanism to remove the foreign matter from the flow of crop.

To provide a more successful detection rate of non-crop foreign matter, a combine could include both an electronic and mechanical detection device. It would be advantageous for a combine utilizing both detection devices to utilize a common ejection mechanism, e.g. a trap door, and latching mechanisms.

SUMMARY OF THE INVENTION

It is an object of this invention to overcome the aforementioned disadvantages of the prior art by providing a latch mechanism for a trap door ejection mechanism which can be actuated by either an electronic or a mechanical detection device.

It is another object of this invention to utilize the same ejection mechanism to remove non-crop foreign matter from the flow of harvester crop material for both an electronic detection mechanism and a mechanical detection mechanism.

It is an advantage of this invention that both electronic and mechanical detection devices can be utilized on a combine feeder housing.

It is a feature of this invention that slugs of crop material can be detected and ejected when an electronic stone detection device is utilized.

It is still another object of this invention to provide a release mechanism operably connected to a trap door latch mechanism which is operable to disconnect the latch mechanism from the trap door when detection of non-crop foreign matter is made electronically or mechanically.

It is a further object of this invention to utilize the rotary motion of the mechanical detection device as a power source for tripping the release of the latch mechanism from the trap door when the non-crop foreign matter is electronically detected.

It is a still further object of this invention to provide a latch mechanism for a trap door which can be actuated by either an electronic detection device or a mechanical detection device and which is durable in construction, inexpensive of manufacture, carefree of maintenance, facile in assemblage and simple and effective in use.

These and other objects, features and advantages are accomplished according to the instant invention by providing a latch mechanism for the trap door of a combine stone detector wherein the latch mechanism is operable to release the trap door for ejection of a stone or other non-crop foreign matter from the feed path of the crop being harvested when the foreign matter is detected either electronically or mechanically. A release mechanism is provided to unlatch the trap door when a pinch roller forces foreign matter downwardly against the trap door. A trip mechanism is operatively connected with the release mechanism to unlatch the trap door when a signal is received from the electronic detection mechanism.

BRIEF DESCRIPTION OF THE DRAWINGS

The advantages of this invention will become apparent upon consideration of the following detailed disclosure of the invention, especially when taken in conjunction with the accompanying drawings wherein:

FIG. 3 is a top view of the side of the feeder housing seen in FIG. 2, corresponding to lines 3—3 of FIG. 2;

FIGS. 4, 5 and 6 are partial side elevational views of the feeder house corresponding to FIG. 2 and showing the sequential steps of the operation of the instant invention when the foreign matter is electronically detected, the initial step being shown in FIG. 4 and the final ejection of the matter being shown in FIG. 6;

FIGS. 7, 8 and 9 are schematic side elevational views of the instant invention corresponding to FIG. 2 and showing the sequential steps of operation of the instant invention when the foreign matter is mechanically detected, the initial step being shown in FIG. 7 and the final ejection of the matter being shown in FIG. 9;

DETAILED DESCRIPTION OF THE PREFERRED EMBODIMENT

Figure 1:
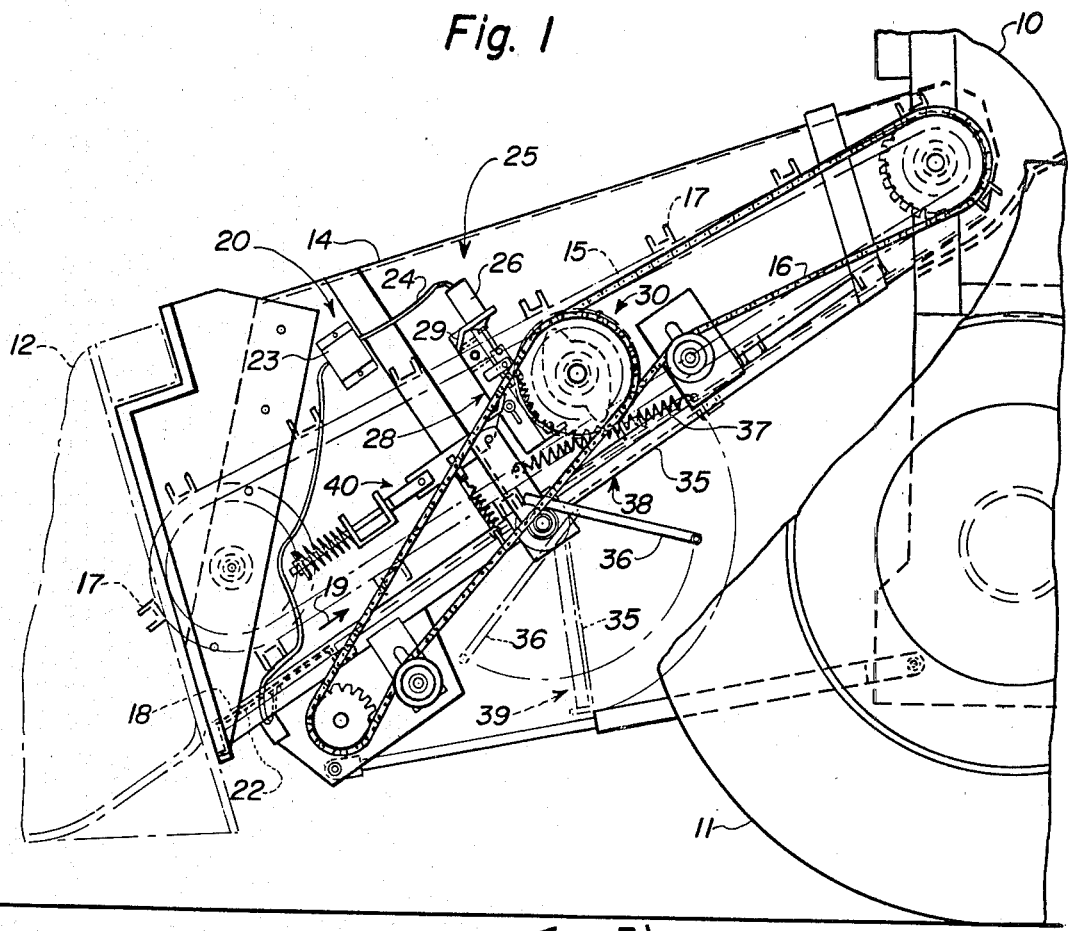
FIG. 1 is a side elevational view of the combine feeder housing incorporating the principal of the instant invention, the combine base unit being shown fragmentally with the front wheel partially removed for clarity, the crop harvesting header being shown fragmentally and in phantom.

Referring now to the drawings and, particularly to FIG. 1, a side elevational view of a feeder housing for a crop harvesting machine, commonly referred to as a combine, can be seen. The combine base unit 10 is mounted on a wheeled frame 11 containing apparatus, not shown, for the harvesting of crop material fed thereto. A forwardly mounted crop harvesting header 12 is conventional in the art and is operable to sever the standing crop, consolidate it and feed it rearwardly to the feeder housing 14, interconnecting the base unit 10 and the header 12 and providing a conduit for conveying crop material to the base unit 10. The feeder housing 14 is generally hollow and houses a crop conveyor 15 driven by the conveyor drive 16 and having lugs 17 thereon for engaging crop material and conveying it along the feeder house floor 18. The direction of the feed path of the crop material along the feeder house floor 18 being shown by the arrow 19.

The electronic detection means 20 includes a sensing plate 22 shown in FIG. 1 as being mounted near the header 12 for early detection of non-crop foreign matter within the feed path. Upon detection of such foreign matter, the control box 23 emits a signal over wire 24 to the actuation means 25, shown in the form of a solenoid 26. The solenoid 26 activates the trip means 28 to cause a subsequent ejection of the foreign matter from the flow of crop material through the feeder housing.

Figure 2:
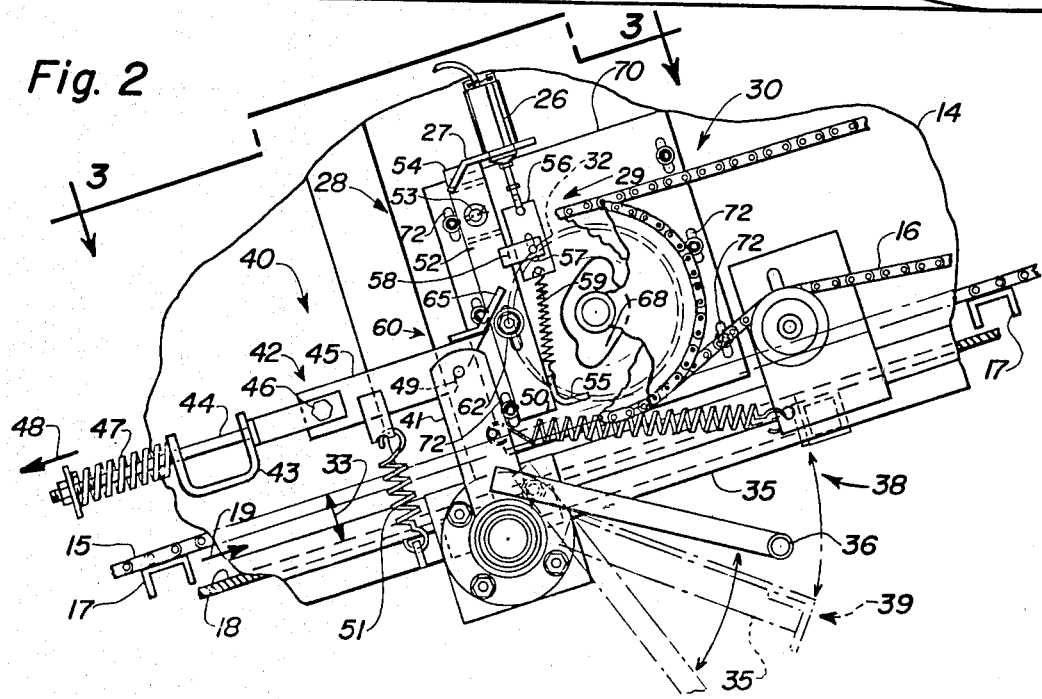
FIG. 2 is an enlarged side elevational view of a portion of the feeder housing of FIG. 1, showing the instant invention, most of the drives having been removed for clarity.

As can be seen in FIGS. 1, 2 and 3, the mechanical detection means 30 includes a pinch roller 32 mounted at a predetermined distance, indicated by the arrow 33, above the feeder house floor 18. Immediately beneath the pinch roller 32, the feeder house floor 18 includes a trap door 35 pivotally mounted on the feeder house 14 and moveable between a closed position 38, wherein the trap door 35 is contiguous to the feeder house floor 18 to permit crop to flow uninterruptedly, and an open position 39, shown in phantom, wherein an opening is provided in the feeder house floor 18 through which the foreign matter can be ejected from the feed path of the crop material. The trap door 35 includes a handle 36 projecting outwardly from the feeder housing 14 for manual manipulation of the door 35 between the closed position 38 and the open position 39. The trap door 35 is shown as being biased toward the open position 39 by means of the spring 37 to provide a positive action for moving it from the closed position 38. However, since the open position 39 is vertically lower than the closed position 38, the trap door 35 could fall into the open position 39 merely by gravity without assistance of the force exerted by the spring 37.

The trap door 35 is held in the closed position 38 by a latching means 40, including a latch member 41 rigidly affixed to the trap door 35 and forming a part thereof to be pivotable therewith. The latching means 40 further includes a latch hook member 42 engageable with the latch member 41 to hold the trap door 35 in the closed position 38. The latch lock member 42 includes a support bracket 43 which slidably receives an elongated bar 44 therethrough. A catch member 45 is pivotally connected to the elongated bar 44 at the pivot connection 46 in line with the major axis of the bar 44. The spring 47 biases the elongated bar 44 for movement in the direction indicated by the arrow 48; however, as is particularly seen in FIG. 2, the elongated bar 44 is of a shape to engage with the bracket 43 and limit the amount of movement thereof in the direction 48. The catch member 45 includes a notch 49 formed therein to engage with the latch member 41 and hold the trap door 35 in the closed position 38. The spring 51 urges the catch member 45 toward engagement with the latch member 41.

The trip means 28, which is operatively associated with the electronic detection means 20, includes a trip link 29 having a first elongated member 52 pivotally connected by a pivot 53 at one end 54 thereof to the feeder house 14, with the remote second end 50 thereof positioned in close proximity to the latching means 40. A stop 55 is provided adjacent the second end 50 of the first member 52 to restrict the amount of movement thereof about pivot 53. A second elongated member 56 is slidably connected via a slot-shaped hole 57 to a bracket 58 which, in turn, is affixed to the first elongated member 52. The second member 56 is connected to the solenoid 26 and is moveable between a passive position, being the normal operating condition in which non-crop foreign matter has not been detected, and an activation position, when foreign matter has been detected by the electronic detection means 20 for effecting the release of the trap door 35 from the latching means 40. The solenoid 26 is affixed to the end 54 of the first member 52 via a mounting bracket 27 and is pivotally moveable with the first member 52 about the pivot 53.

As can be seen in FIG. 2, a spring 59 interconnects the feeder house 14 and the second member 56 to urge the second member into the activation position. With this arrangement, it is contemplated that the solenoid will be operable, when energized, to hold the second member in the passive position. Should a power failure to the solenoid 26 be encountered, the second member 56 would automatically be moved into the activation position and the trap door 35 ultimately moved to the open position 39, thereby signaling the operator of the existence of the power failure. One skilled in the art should readily realize that a solenoid 26 could be provided to push the second member 56 into the activation position when energized. Accordingly, the spring 59 would have to be repositioned to urge the second member 56 into the passive position.

Referring again to FIGS. 1, 2 and 3, a release means 60 is operatively associated with the trip means 28 and the latching means 40 to effect the release of the catch member 45 from the latch member 41. As is best seen in FIG. 2, the release means 60 includes a roller 62 mounted on the first elongated member 52 for adjustment to or away from the pivot 53 and an inclined ramp 65 affixed to the catch member 45 and positioned in close proximity to the roller 62. In operation to effect the unlatching of the trap door 35, the roller 62 and the ramp 65 are caused to be engaged with one another and, as a result, the ramp 65 rides up over the roller 62 causing the catch member 45 to rotate about the catch pivot 46. This movement releases the catch member 45 from the latch member 41 and permits the trap door 35 to move into the open position 39.

A cam member 68 is affixed to the pinch roller 32 and continuously rotatable therewith during operation of the crop harvesting machine. The trip means 28 is positioned such that the second end 50 of the first elongated member 52 is located between the catch member 45 and the cam member 68. The stop 55 prevents the first member 52 from engaging the cam member 68. When the second elongated member 56 is in the passive position, the cam member 68 is not engageable therewith; however, when the second member 56 is moved into the activation position, the cam member 68 contacts the second member 56 and causes the first member 52 to swing about the pivot 53 away from the cam member 68 and toward the catch member 45.

The pinch roller 32 is rotatably mounted on a bearing plate 70 having slot-shaped holes 72 to enable adjustment of the pinch roller 32 relative to the trap door 35, so as to vary the distance 33 therebetween. The first elongated member 52 is pivotally connected to the bearing plate 70 so that the spacial relationship between the second elongated member 56 and the cam member 68 will not vary whenever the position of the pinch roller 32 is changed to adjust the distance 33. However, the roller 52 is adjustable relative to the first member 52 so that the positional relationship between the roller 62 and the inclined ramp 65 can be maintained whenever the position of the pinch roller 32 is adjusted.

Referring now to FIGS. 4, 5 and 6, the operation of the instant invention to eject a stone having been detected by the electronic detection means 20 can be seen. FIG. 4 depicts the instant invention just as the stone S is being sensed by the electronic detection means 20. The catch member 45 of the latch means 40 is connected to the latch member 41, thereby holding the trap door 35 in the closed position 38 to maintain an uninterrupted flow of crop material. The solenoid 26 is permitting the second elongated member 56 to move from the passive position to the activation position.

In FIG. 5, the second member 56 has moved into the activation position and has been engaged by the cam member 68 rotating in the direction indicated by the arrow 69. The cam member 68 has forced the first member 52 to rotate about its pivot 53, thereby engaging the roller 62 into the inclined ramp 65 on the catch member 45. The engagement between the roller 62 and the ramp 65 causes the catch member 45 to rotate about its pivotal connection 46 with the elongated bar 44, and, as a result, forcing the catch member 45 to disconnect from the latch member 41 as the stone S approaches the trap door 35.

In FIG. 6, the trap door 35 has swung to the open position 39, allowing the stone S to be ejected from the flow of crop material. The solenoid 26 has been re-energized, drawing the second elongated member 56 back into the passive position. This permits the first elongated member 52 to be forced back into its normal position against the stop 55 by the spring 47 biasing the catch member 45 downwardly toward the latch member 41. At this point, it would be necessary for the operator to close the trap door 35, such as through the use of the handle 36, thereby reconnecting the latch member 41 with the catch member 45, to continue with the crop harvesting operation.

FIGS. 7, 8 and 9 depict the operation of the instant invention to eject a stone upon detection thereof by the mechanical detection means 30. As seen in FIG. 7, all components of the instant invention are in their normal operating position as seen in FIG. 4 and described relative thereto. The stone S has escaped detection by the electronic detection means 20 and is about to become engaged by the pinch roller 32.

In FIG. 8, the stone S passes beneath the pinch roller 32, forcing the trap door 35 to move from the closed position 38 toward the open position 39. This pivotal movement of the trap door 35 causes a corresponding motion in the latch member 41. Since the latch member 41 is still received within the notch 49 in the catch member 45, the elongated bar 44 and catch member 45 are moved substantially linerally in the direction indicated by arrow 75 against the bias imposed by the spring 47. This motion forces the inclined ramp 65 into engagement with the roller 62. Since the stop 55 prevents the first member 52 from rotating toward the cam member 68, the engagement between the roller 62 and inclined ramp 65 forces a pivotal movement of the catch member 45 about its pivot 46 to release the latch member 41 and to permit the trap door to move into the open position 39 as seen in FIG. 9. After the catch member 45 is disconnected from the latch member 41, the spring 47 forces the latch lock member 42 back into its original position. As with the operation of the instant invention described relative to FIGS. 4-6, the trap door 35 must be returned to its closed position 38 to continue the crop harvesting operation.

Figure 10:
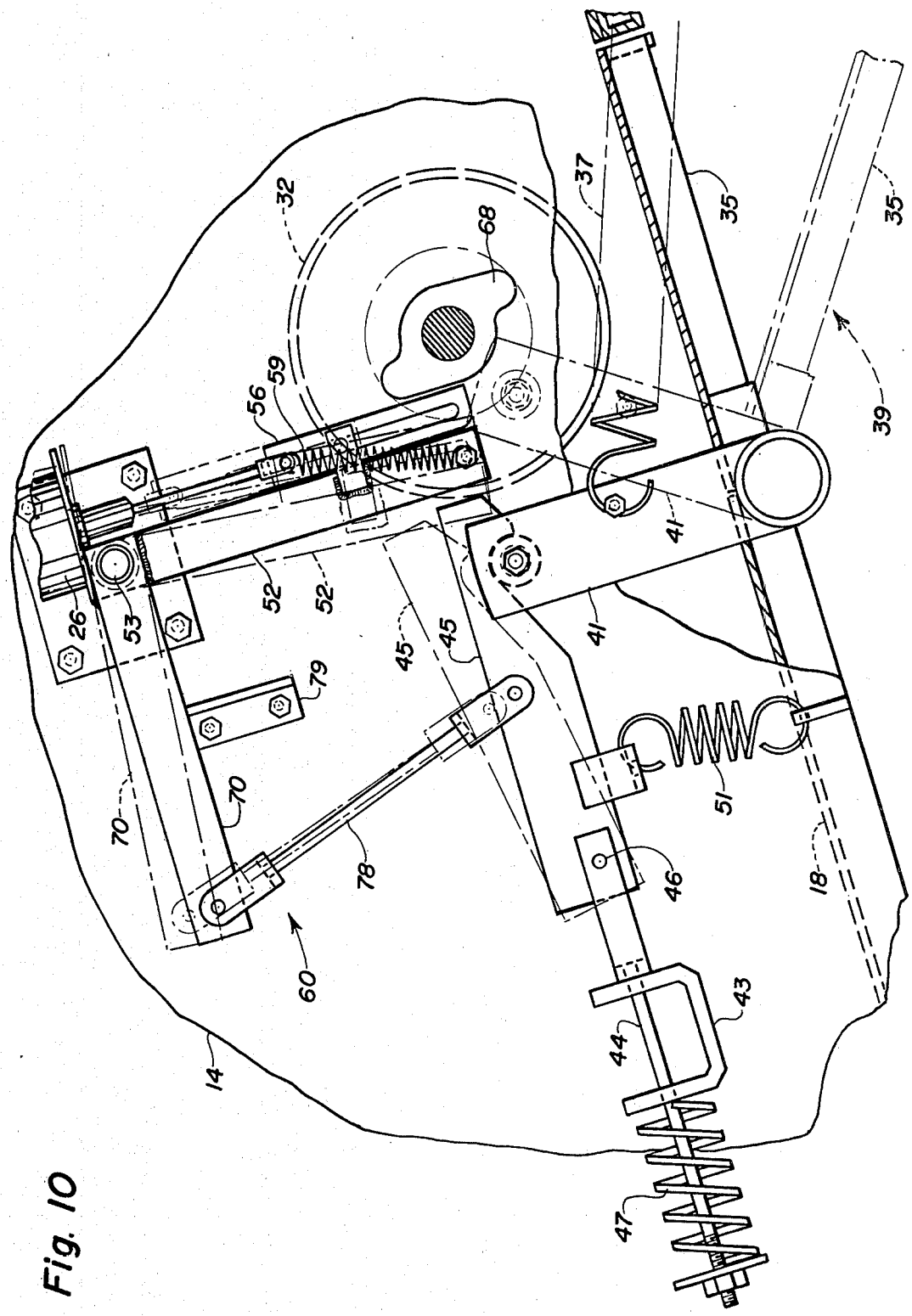
FIG. 10 is a schematic side elevational view of alternative embodiment of the instant invention, showing the operation thereof in phantom upon the electronic detection of the foreign matter.

Referring now to FIG. 10, an alternative embodiment of the instant invention can be seen. The trip means 28, the latching means 40, the solenoid 26, the trap door 35 and the cam member 68 are substantially as described heretofore. The release means 60, however, is comprised of a bell crank 77 rigidly affixed to the first member 52 at right angles thereto and a connecting link 78 interconnecting the bell crank 77 and the catch member 45. The movement of the bell crank 77 toward the catch member 45 is limited by a stop 79. As is shown in phantom, when the cam member 68 engages the second elongated member 56 to cause a pivotal motion of the first elongated member 52 about the pivot 53, the bell crank 77 is rotated therewith. The connecting link 78 effects a corresponding pivotal movement of the catch member 45 about its pivot 46 to disconnect the catch member 45 from the latch member 41.

Similar to that described above in reference to FIGS. 7, 8 and 9, when the pinch roller 32 forces foreign matter downwardly against the trap door 35, the latch member 41 pulls the latch lock member 42 toward the cam member 68. Since the connecting link 78 is of a fixed length and the bell crank 77 is prevented from movement toward the catch member 45 by the stop 79, the catch member 45 pivotally moves about its pivot 46 when it moves linerally toward the cam member 68 to effect the release of the latch member 41 and permit the trap door 35 to move into the open position 39. As noted above, to maintain the proper orientation between the release means 60 and the latching means 40, the length of the connecting link 78 would be adjustable to compensate for any adjustments to the position of the pinch roller 32.

Figure 11:
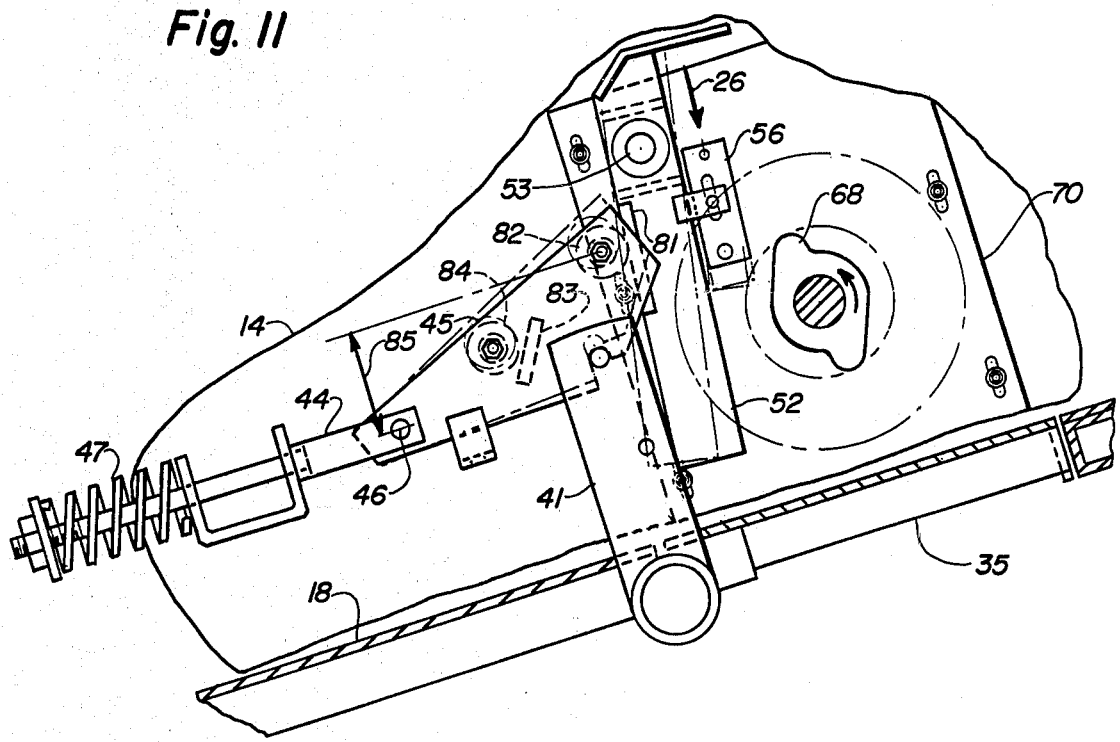
FIG. 11 is a schematic side elevational view of another alternative embodiment of the instant invention showing the operation thereof in phantom upon the electronic detection of the foreign matter.
Figure 12:
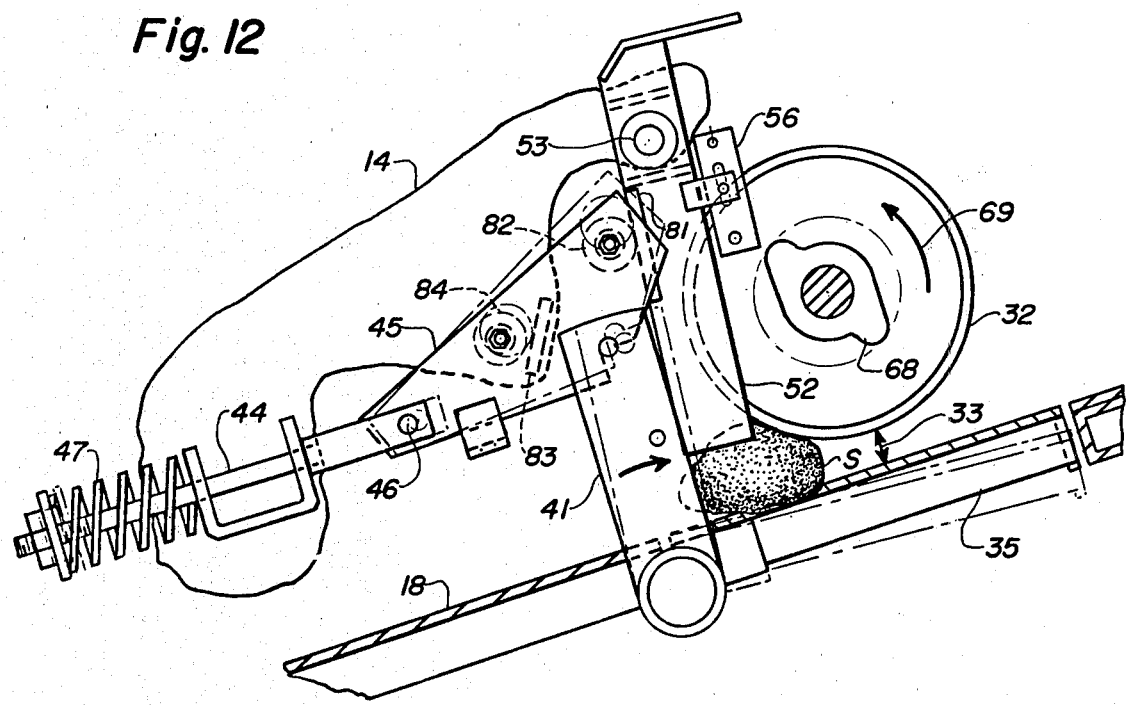
FIG. 12 is a schematic side elevational view of the alternative embodiment of the instant invention shown in FIG. 11, showing the operation thereof in phantom upon the mechanical detection of the foreign matter.

Referring now to FIGS. 11 and 12, another alternative embodiment of the instant invention can be seen. The trip means 28, the latching means 40, the trap door 35, the solenoid 26 and the cam member 68 are substantially as described above in reference to FIGS. 1-9. However, the release means 60 is comprised of a flange 81 projecting outwardly from the first elongated member 52 and a first roller 82 mounted on the catch member 45 in close proximity to the flange 81. To provide additional assistance to the operation described below, the release means 60 could also include an inclined ramp 83 affixed to the feeder house 14 and a second roller 84 mounted on the catch member 45 forward of the inclined ramp 83.

The operation of the release means 60 upon detection of non-crop foreign matter by the electronic detection means 20 is depicted in FIG. 11. When the cam member 68 engages the second elongated member 56, thereby rotating the first member 52 about its pivot 53, the flange 81 engages the roller 81. Because the roller 82 is not mounted in axial alignment with the major axis of the elongated bar 44, the resultant moment arm, relative to the pivot 46 as indicated by the arrow 85, effects a pivotal movement of the catch member 45 about its pivot 46 to release the latch member 41 and permit the trap door 35 to move into the open position 39.

The operation of the release means 60 upon the mechanical detection of non-crop foreign matter is depicted in FIG. 12. As described with respect to FIGS. 7-9, the movement of the trap door 35 toward its open position 39 causes the catch member 45 to move rearwardly toward the cam member 68. As a result of this movement, the roller 82 engages the flange 81 to cause a pivotal movement of the catch member 45 as described above relative to the electronic detection of the foreign matter. An advantage of this particular configuration is that adjustment of the bearing plate 70 to vary the distance 33 between the pinch roller 32 and the trap door 35 does not necessitate a corresponding adjustment of any of the other components in the release means 60.

As noted above, the catch member could include a second roller 84 engageable with an inclined ramp 83 affixed to the feeder house 14 to assist in pivotally moving the catch member 45 about its pivot 46 upon the mechanical detection of non-crop foreign matter. When the catch member 45 moves toward the cam member 68, the roller 84 rides up over the ramp 83 similar to the relationship described above relative to roller 62 and ramp 65. One skilled in the art will readily realize that a slight rearrangement of the position of the pivot 53 and the stop 55, such that the flange 81 would be inclined similar to the ramp 83, could also assist in effecting the pivotal movement of the catch member 45.

It will be understood that there is changes in the details, material, steps and arrangement of parts which have been described and illustrated and explained in the nature of the invention, will occur to and may be made by those skilled in the art upon a reading of the disclosure within the principals and scope of the invention. The foregoing description illustrates the preferred embodiment of the invention. However, concepts as based upon such description, may be employed in other embodiments without departing from the scope of the invention. Accordingly, the following claims are intended to protect the invention broadly as well as in the specific form shown.

Having thus described the invention, what is claimed is:

1. A latch mechanism for a non-crop foreign matter detection and ejection mechanism on a crop harvesting machine, said detection and ejection mechanism having a trap door releasably held by said latch mechanism in a closed operative position, said trap door being moveable to an open position in which non-crop foreign matter can be ejected from said crop harvesting machine, an electronic detection means for electronically sensing the presence of said non-crop foreign matter and emitting a signal upon said detection, and a mechanical detection means for sensing the presence of non-crop foreign matter by the size of said matter and forcing said trap door toward said open position, comprising:

means for moving said trap door from said closed position to said open position;

a latch member affixed to said trap door and moveable in a first direction when said trap door moves from said closed position toward said open position;

a latch lock member releasably connected to said latch member to hold said trap door in said closed position;

release means operatively associated with said latch lock member for effecting the release of said latch member from said latch lock member to permit said trap door to move to said open position upon detection of said non-crop foreign matter, said release means being operable when said mechanical detection means forces said trap door toward said open position; and trip means operatively associated with said electronic detection means and with said release means to receive the signal emitted from said electronic detection means and cause said release means to effect the release of said latch member from said latch lock member and permit the trap door to be moved to said open position.

2. The latch mechanism of claim 1 wherein said latch lock member includes a support bracket affixed to said crop harvesting machine, an elongated bar slidably received within said support bracket, a biasing mechanism to urge said elongated bar in a second direction generally opposite of said first direction of movement of said latch member, a limit means affixed to said elongated bar to limit the amount of movement of said bar in said second direction, and a catch pivotally connected to said bar, said catch being releasably connectable to said latch member and operatively associated with said release means.

3. The latch mechanism of claim 2 wherein said crop harvesting machine includes a feeder housing having a feed path along which crop material is conveyed, said trap door being positioned at least partially beneath said feed path, said mechanical detection means including a pinch roller rotatably mounted within said feeder housing a predetermined distance above said trap door such that said feed path lies between said pinch roller and said trap door, said pinch roller being operable to force objects having a height above said trap door greater than said predetermined distance against said trap door and move said trap door toward said open position.

4. The latch mechanism of claim 3 wherein said release means includes a ramp affixed to said catch at an angle to said first and second directions of movement and a roller mounted adjacent to said ramp for relative movement therebetween, such that movement of said latch member in said first direction and the corresponding movement of said catch connected thereto causes said ramp to engage said roller and pivotally move said catch, the pivotal movement of said catch separating said catch from said latch member to permit said trap door to move to said open position.

5. The latch mechanism of claim 4 wherein said trap means includes a first elongated member moveably mounted on said crop harvesting machine adjacent to said latch lock member, said roller being mounted on said first member, said trip means further including an actuation means for receiving the signal from said electronic detection means and effecting movement of said first member toward said catch, such that said roller engages said ramp to cause pivotal movement of said catch and permit the release of said latch member so that the trap door moves to said open position.

6. The latch mechanism of claim 5 wherein said first elongated member has a first end pivotally connected to said crop harvesting machine and a remote second end, said roller being mounted on said first member remotely of said first end.

7. The latch mechanism of claim 6 wherein said pinch roller is mounted proximate to said first elongated member, said feeder housing including drive means for continuously rotating said pinch roller during operation of said crop harvesting machine, said pinch roller including a cam member affixed thereto and rotatable therewith, said feeder housing further having a stop to prevent said first member from engaging said cam member, said trip means further including a second elongated member slidably connected to said first member and operatively connected to said actuation means, said actuation means being operable to move said second member into an activation position engageable with said cam member, said second member being positioned such that engagement with said cam member causes pivotable movement of said first and second members about said first member pivot and moves said roller into engagement with said ramp, thereby permitting said trap door to move to said open position.

8. The latch mechanism of claim 7 wherein said means for moving said trap door includes a spring interconnecting said latch member and said feeder housing to bias said trap door toward said open position.

9. The latch mechanism of claim 8 wherein said actuation means is a solenoid connected to the first end of said first elongated member.

10. In a crop harvesting machine having a foreign matter detection mechanism for detecting non-crop foreign matter in the crop being harvested, a feeder housing having a feed path along while crop material is conveyed, and an ejection mechanism along said feed path for the ejection of non-crop foreign matter upon the detection thereof by said detection mechanism, said ejection mechanism including a trap door moveable between an open position in which said non-crop foreign matter can be ejected from said feeder housing and a closed position in which crop material moves uninterruptedly along said feed path, means for moving said trap door from said closed position to said open position and a latch mechanism to releasably hold said trap door in said closed position, said detection mechanism including an electronic detection means for electronically sensing the presence of said non-crop foreign matter and emitting a signal upon said detection and a mechanical detection means for sensing the presence of said non-crop foreign matter by the size of said matter and forcing said trap door toward said open position, an improved latch means comprising:

a latch member affixed to said trap door and moveable in a first direction when said trap door moves from said closed position toward said open position;

a latch lock member releasably connected to said latch member to hold said trap door in said closed position;

release means operatively associated with said latch lock member for effecting the release of said latch member from said latch lock member to permit said trap door to move to said open position upon detection of said non-crop foreign matter, said release means being operable when said mechanical detection means forces said trap door toward said open position; and trip means operatively associated with said electronic detections means and with said release means to receive the signal emitted from said electronic detection means and cause said release means to effect the release of said latch member from said latch lock member and permit the trap door to be moved to said open position.

11. The crop harvesting machine of claim 10 wherein said latch lock member is moveable in said first direction with said latch member and is pivotable to release said latch member, said release means including a ramp affixed to said latch lock member at an angle to said first direction of movement and a roller supported by said feeder housing adjacent to said ramp for relative movement therebetween, such that movement of said latch lock member in said first direction with said latch member causes said ramp to engage said roller to effect a pivotal movement of said latch lock member and release said latch member to permit said trap door to move to said open position.

12. The crop harvesting machine of claim 11 wherein said trip means includes a first elongated member moveably mounted on said feeder housing adjacent to said latch lock member, said roller being mounted on said first member, said trip means further including an actuation means for receiving the signal from said electronic detection means and effecting movement of said first member toward said latch lock member, such that said roller engages said ramp causing pivotal movement of said latch lock member to permit the release of said latch member and allow said trap door to move said open position.

13. The crop harvesting machine of claim 12 wherein said first elongated member has a first end pivotally connected to said feeder housing and a remote second end, said roller being mounted on said first member remotely of said first end.

14. The crop harvesting machine of claim 13 wherein said trip means further includes a rotatable cam member mounted on said feeder housing proximate to said first elongated member, said feeder housing having a stop to prevent said first member from engaging said cam member and drive means for rotating said cam member, said trip means further including a second elongated member slidably connected to said first member and operatively connected to said actuation means, said actuation means being operable to move said second member into engagement with said cam member upon the reception of a signal from said electronic detection means, said second member being positioned such that engagement with said cam member causes pivotal movement of said first and second members about said pivot and move said roller into engagement with said ramp, thereby permitting said trap door to move to said open position.

15. The crop harvesting machine of claim 14 wherein said latch lock member includes a support bracket affixed to said feeder housing, an elongated bar slidably received within said support bracket, a biasing mechanism to urge said elongated bar in a second direction generally opposite of said first direction of movement of said latch member, a limit means affixed to said elongated bar to limit the amount of movement of said bar in said second direction, and a catch pivotally connected to said bar, said catch being releasably connectable to said latch member and having said ramp mounted thereon.

16. The crop harvesting machine of claim 15 wherein said mechanical detection means includes a pinch roller rotatably mounted within said feeder housing a predetermined distance above said trap door such that said feed path lies between said pinch roller and said trap door, said pinch roller being operable to force objects having a height above said trap door greater than said predetermined distance against said trap door and move said trap door toward said open position, said pinch roller having said cam member mounted thereon and rotatable therewith.

17. The latch mechanism of claim 16 wherein said means for moving said trap door includes a spring interconnecting said latch member and said feeder housing to bias said trap door toward said open position, said actuation means being a solenoid connected to the first end of said first elongated member.

* * * * *